United States Patent
Hirano et al.

(10) Patent No.: US 11,335,099 B2
(45) Date of Patent: May 17, 2022

(54) PROCEEDABLE DIRECTION DETECTION APPARATUS AND PROCEEDABLE DIRECTION DETECTION METHOD

(71) Applicant: Toyota Jidosha Kabushiki Kaisha, Toyota (JP)

(72) Inventors: Kota Hirano, Tokyo (JP); Daisuke Hashimoto, Chofu (JP); Satoshi Takeyasu, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 16/655,936

(22) Filed: Oct. 17, 2019

(65) Prior Publication Data
US 2020/0133283 A1    Apr. 30, 2020

(30) Foreign Application Priority Data

Oct. 25, 2018 (JP) .............................. JP2018-200992

(51) Int. Cl.
| | |
|---|---|
| *G06V 20/58* | (2022.01) |
| *G05D 1/02* | (2020.01) |
| *G06K 9/62* | (2022.01) |
| *G06V 10/10* | (2022.01) |
| *G06V 20/56* | (2022.01) |

(52) U.S. Cl.
CPC ......... *G06V 20/584* (2022.01); *G05D 1/0214* (2013.01); *G05D 1/0221* (2013.01); *G06K 9/6277* (2013.01); *G06V 10/10* (2022.01); *G06V 20/588* (2022.01)

(58) Field of Classification Search
CPC .. G06K 9/00825; G06K 9/78; G06K 9/00798; G05D 1/0221; G05D 1/0214
See application file for complete search history.

(56) References Cited

U.S. PATENT DOCUMENTS

| | | | |
|---|---|---|---|
| 8,559,673 B2 | 10/2013 | Fairfield et al. | |
| 9,442,487 B1 * | 9/2016 | Ferguson | G06K 9/6277 |

(Continued)

FOREIGN PATENT DOCUMENTS

WO    WO-2010041315 A1 *    4/2010    ............. G01C 21/26

OTHER PUBLICATIONS

Fairfield, N. et al., "Traffic light mapping and detection", 2011 IEEE International Conference on Robotics and Automation in 2011.
(Continued)

*Primary Examiner* — Dale W Hilgendorf
(74) *Attorney, Agent, or Firm* — Dinsmore & Shohl LLP

(57) ABSTRACT

A proceedable direction detection apparatus includes a processor. The processor inputs an image acquired from an image capturing unit mounted on a vehicle into a classifier that is pre-trained to output a proceedable certainty degree indicating a proceedable probability of each relative bearing with respect to a predetermined direction relative to a vehicle based on a display status of a traffic signal in the image. The processor calculates, using the classifier, the proceedable certainty degree of each relative bearing based on the display status of the traffic signal in the image. The processor determines the direction in which the vehicle can proceed based on a proceedable certainty degree of each relative bearing.

4 Claims, 10 Drawing Sheets

(56) References Cited

U.S. PATENT DOCUMENTS

| | | | |
|---|---|---|---|
| 2011/0133956 A1* | 6/2011 | Yamada | G08G 1/09675 340/929 |
| 2011/0182475 A1* | 7/2011 | Fairfield | G05D 1/0212 382/104 |
| 2012/0288150 A1* | 11/2012 | Kido | G06V 20/584 382/103 |
| 2015/0186734 A1* | 7/2015 | Nakagawa | G06V 20/584 382/104 |
| 2015/0210312 A1* | 7/2015 | Stein | H04N 7/183 701/41 |
| 2017/0024622 A1* | 1/2017 | Mizutani | G06V 20/584 |
| 2017/0154527 A1* | 6/2017 | Yoshitomi | G08G 1/096783 |
| 2017/0160743 A1* | 6/2017 | Schweikl | G08G 1/091 |
| 2018/0144203 A1* | 5/2018 | Moosaei | G06T 5/007 |
| 2018/0300567 A1* | 10/2018 | Qin | G08G 1/09623 |
| 2019/0122059 A1* | 4/2019 | Zhou | G06V 10/56 |
| 2019/0332875 A1* | 10/2019 | Vallespi-Gonzalez | G05D 1/0088 |
| 2020/0401824 A1* | 12/2020 | Hayashi | G08G 1/0125 |
| 2021/0139019 A1* | 5/2021 | Ito | B60W 30/09 |
| 2021/0179135 A1* | 6/2021 | Ahn | G08G 1/096741 |
| 2021/0192239 A1* | 6/2021 | Ma | G08G 1/096725 |
| 2021/0201058 A1* | 7/2021 | Artamonov | G06V 20/46 |

OTHER PUBLICATIONS

Sarkis, A., "Self-driving cars: Implementing real-time traffic light detection and classification in 2017", Sep. 20, 2017, https://medium.com.

\* cited by examiner

PROCEEDABLE DIRECTION DETECTION APPARATUS AND PROCEEDABLE DIRECTION DETECTION METHOD

CROSS-REFERENCE TO RELATED APPLICATIONS

This application claims priority to Japanese Patent Application No. 2018-200992 filed, on Oct. 25, 2018, which is, incorporated herein by reference in its entirety including the specification, drawings and abstract.

BACKGROUND

1. Technical Field

The present disclosure relates to a proceedable direction detection apparatus and a proceedable direction detection method that detect a direction in which a vehicle can proceed based on an image surrounding the vehicle.

2. Description of Related Art

Conventionally, a technology for autonomous driving control of a vehicle has been studied. For autonomous driving control of a vehicle, it is required to automatically determine whether a traffic signal device (hereinafter, simply referred to as a traffic signal), provided on the road on which a vehicle travels, permits or restricts the passage of the vehicle. Thus, a technology for detecting a traffic signal from an image acquired by a camera mounted on a vehicle has been proposed (see, for example, U.S. Pat. No. 8,559,673, Nathaniel Fairfield et al., Traffic Light Mapping and Detection, 2011 IEEE International Conference on Robotics and Automation, 2011 and Self-Driving Cars: Implementing Real-Time Traffic Light Detection and Classification in 2017, available at codeburst.io).

SUMMARY

However, there are various kinds of traffic signals, and a case where it is not possible to determine a direction in which the vehicle can proceed based only on a color of emitted light from a traffic signal. With the above-described technology, it is not possible to appropriately determine the direction in which the vehicle can proceed based on a traffic signal displaying a diagonal arrow or a traffic signal at which whether the vehicle can proceed differs depending on the environment surrounding the vehicle, such as the presence or absence of a vehicle coming from the opposite direction.

The present disclosure provides a proceedable direction detection apparatus and a proceedable direction detection method that can detect a proceedable direction of a vehicle.

A proceedable direction detection apparatus according to a first aspect of the present disclosure includes a processor. The processor is configured to input an image acquired from an image capturing unit mounted on a vehicle into a classifier that is pre-trained to output a proceedable certainty degree indicating a proceedable probability of each relative bearing with respect to a predetermined direction relative to a vehicle based on a display status of a traffic signal in the image. The processor is configured to calculate, using the classifier, the proceedable certainty degree of each relative bearing, based on the display status of the traffic signal in the image. The processor is configured to determine a proceedable direction of the vehicle based on the proceedable certainty degree of each relative bearing.

The classifier may be pre-trained to calculate the proceedable certainty degree of each relative bearing based on a display characteristic of a traffic signal for each region. The processor may input, into the classifier, information indicating, a region in which the vehicle is located together with the image.

Further, when the traffic signal has a plurality of traffic lights, the processor may calculate the proceedable certainty degree of each relative bearing for each of the lit traffic lights among the plurality of traffic lights. The processor may set, as the proceedable direction of the vehicle, a relative bearing in which the proceedable certainty degree that is equal to or higher than a predetermined threshold value is calculated for each of the lit traffic lights.

A proceedable direction detection method according to a second aspect of the present disclosure is executed using a processor. The proceedable direction detection method includes: a step of inputting, by the processor, an image acquired from an image capturing unit mounted on a vehicle into a classifier that is pre-trained to output a proceedable certainty degree indicating a proceedable probability of each relative bearing with respect to a predetermined direction relative to a vehicle based on a display status of a traffic signal in the image; a step of calculating, by the processor, the proceedable certainty degree of each relative bearing based on the display status of the traffic signal in the image, using the classifier; and a step of determining, by the processor, a proceedable direction of the vehicle based on the proceedable certainty degree of each relative bearing.

With a proceedable direction detection apparatus and a proceedable direction detection method according to each aspect of the present disclosure, it is possible to detect a direction in which a vehicle can proceed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, a proceedable direction detection apparatus will be described with reference to the drawings. The proceedable direction detection apparatus detects a traffic signal captured in an image surrounding a vehicle, acquired by a camera mounted on the vehicle and detects a direction in which the vehicle can proceed based on a display status of the traffic signal in the image, by inputting the image into a classifier. For this reason, the classifier is pre-trained to output a proceedable certainly degree indicating a proceedable probability of each relative bearing with respect to a predetermined direction relative to the vehicle based on information indicating the display status or the traffic signal such as a lighting condition of each traffic light of the traffic signal, a road sign installed around the traffic signal, and the environment around the traffic signal. When one traffic signal has a plurality of traffic lights, the classifier outputs the proceedable certainty degree of a relative bearing for each traffic light. Then, the proceedable direction detection apparatus determines a direction in which the vehicle can proceed, based on the proceedable certainty degree of the relative bearing that is output for each traffic light.

Hereinbelow, an example in which the proceedable direction detection apparatus is applied to a vehicle control system will be described. In this example, the proceedable direction detection apparatus detects a traffic signal installed on a road on which a vehicle is traveling and detects a direction in which a vehicle can proceed based on a display status of the detected traffic signal, by executing a process of detecting a proceedable direction for an image acquired by a camera mounted on the vehicle. Further, based on a result of the detection, the proceedable direction detection apparatus controls autonomous driving of the vehicle.

Figure 1:
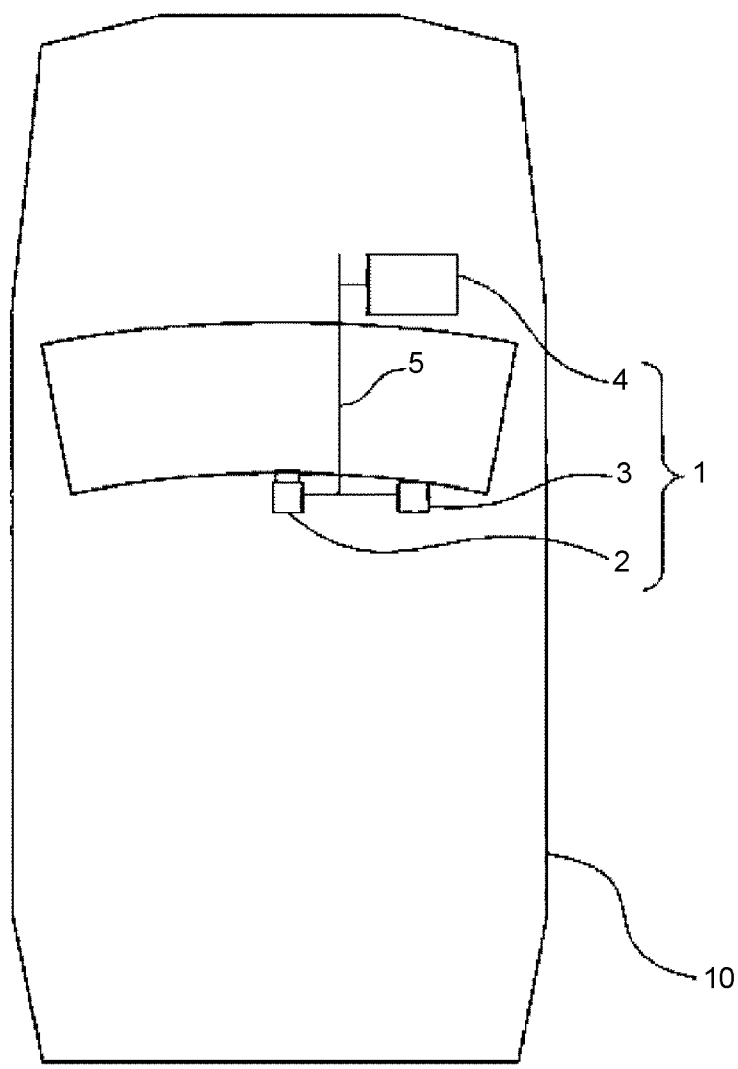
FIG. 1 is a diagram schematically illustrating a vehicle control system on which a proceedable direction detection apparatus is mounted.
Figure 2:
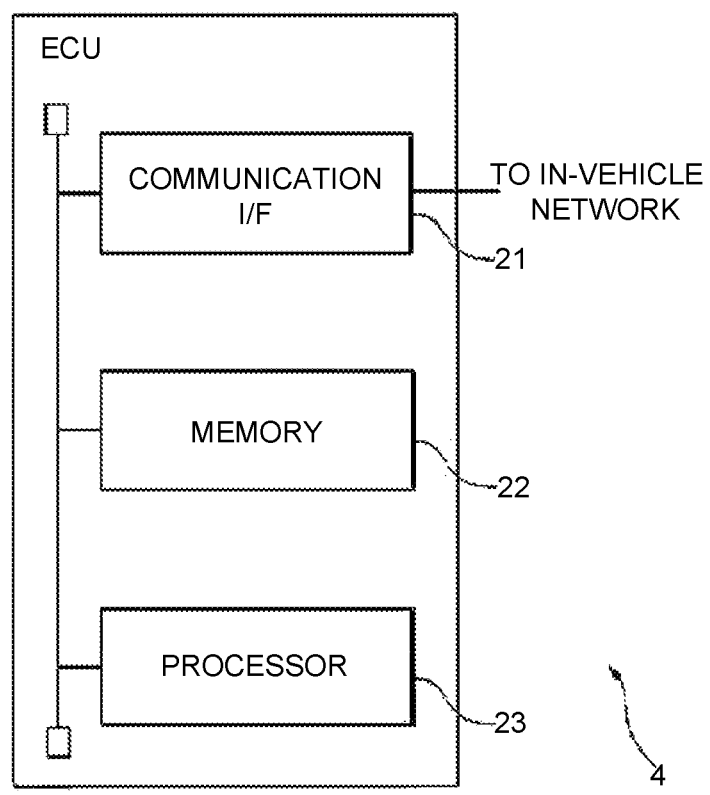
FIG. 2 is a diagram illustrating a configuration of hardware of an electronic control device as one embodiment of the proceedable direction detection apparatus.

FIG. 1 is a diagram schematically illustrating the vehicle control system on which the proceedable direction detection apparatus is mounted. Moreover, FIG. 2 is a diagram illustrating a configuration of hardware of an electronic control device as one embodiment of the proceedable direction detection apparatus. In the present embodiment, a vehicle control system 1, mounted on a vehicle 10 and controlling the vehicle 10, includes a camera 2 for capturing the surroundings of the vehicle 10, a positioning information receiver 3, and an electronic control unit (ECU) 4 as one example of the proceedable direction detection apparatus. The camera 2, the positioning information receiver 3, and the ECU 4 are connected to be able to communicate with one another via an in-vehicle network 5, conforming to a standard such as a controller area network. In addition, the vehicle control system 1 may further include a navigation system.

The camera 2 is an example of an image capturing unit. The camera 2 includes a two-dimensional detector including an array of photoelectric conversion elements having sensitivity to visible light, such as a CCD or a C-MOS, and imaging optics that form an image of an area, which is an object to be photographed, on the two-dimensional detector.

The camera 2 is mounted, for example, in a cabin of the vehicle 10 so as to face the front of the vehicle 10. Then, the camera 2 captures a front area of the vehicle 10 at a predetermined image capturing cycle (for example, every 1/30 seconds to 1/10 seconds), and generates an image in which the front area of the vehicle 10 is captured. In addition, the image acquired by the camera 2 may be a color image so that the proceedable direction detection apparatus can accurately identify a color emitted from a traffic light.

Each time the camera 2 generates an image, the camera 2 outputs the generated image to the ECU 4 via the in-vehicle network 5.

The positioning information receiver 3 is one example of a positioning unit. The positioning information receiver 3 acquires positioning information indicating a current position of the vehicle 10. For example, the positioning information receiver 3 can be a GPS receiver. Each time the positioning information receiver 3 acquires positioning information, the positioning information receiver 3 outputs the acquired positioning information to the ECU 4 via the in-vehicle network 5.

The ECU 4 controls the vehicle 10. In the present embodiment, the ECU 4 controls autonomous driving of the vehicle 10 based on an object detected from a series of images acquired by the camera 2. For this reason, the ECU 4 includes a communication interface 21, a memory 22, and a processor 23.

The communication interface 21 is one example of a communication unit. The communication interface 21 includes an interface circuit, used to connect the ECU 4 to the in-vehicle network. In other words, the communication interface 21 is connected to the camera 2 via the in-vehicle network 5. Each time an image is received from the camera 2, the communication interface 21 delivers the received image to the processor 23.

The memory 22 is one example of a storage unit. The memory 22 includes, for example, a volatile semiconductor memory and a non-volatile semiconductor memory. The memory 22 stores various kinds of data used in a proceedable direction detection process executed by the processor 23 of the ECU 4, for example, the image received from the camera 2, various parameters for specifying a classifier used for the proceedable direction detection process, and various threshold values used for the proceedable direction detection process. Furthermore, the memory 22 may store map information and the like. The map information may include a kind of traffic signal (for example, whether a traffic signal displays an arrow) that is installed on the road on which the vehicle 10 is traveling.

The processor 23 is one example of a control unit. The processor 23 includes one or more central processing units (CPUs) and peripheral circuits thereof. The processor 23 may further include other operation circuits, such as a logical operation unit, a numerical operation unit, and a graphic processing unit. While the vehicle 10 is traveling, each time an image is received from the camera 2, the processor 23 executes a vehicle control process, including the proceedable direction detection process, for the received image. Then, the processor 23 controls autonomous driving of the vehicle 10 based on a detected range of the proceedable direction of the vehicle 10.

Figure 3:
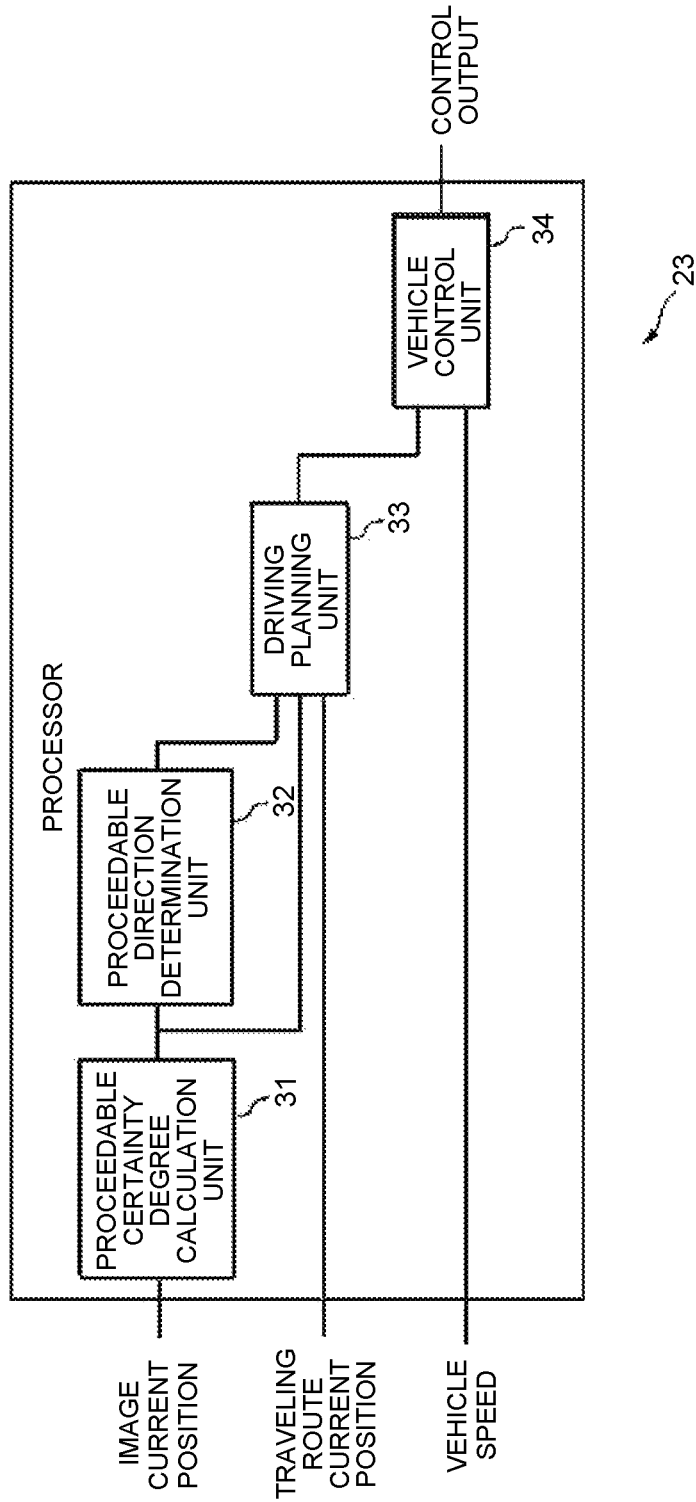
FIG. 3 illustrates a functional block diagram of a processor of the electronic control device associated with a vehicle control process that includes a proceedable direction detecting process.

FIG. 3 is a functional block diagram of the processor 23 of the ECU 4 associated with the vehicle control process including the proceedable direction detection process.

The processor 23 includes a proceedable certainty degree calculation unit 31, a proceedable direction determination unit 32, a driving planning unit 33, and a vehicle control unit 34. Each of the units included in the processor 23 is, for example, a functional module implemented by a computer program operated on the processor 23. Alternatively, each of the units included in the processor 23 may be a dedicated operation circuit provided in the processor 23. Further, among the units included in the processor 23, the proceedable certainty degree calculation unit 31 and the proceedable direction determination unit 32 execute the proceedable direction detect on process. In addition, since each of the units included in the processor 23 executes the same process for each image, the process for one image will be described below.

By inputting an image received from the camera 2 into the classifier, the proceedable certainty degree calculation unit 31 detects a traffic signal displayed in the image, and also outputs the proceedable certain degree indicating a proceedable probability of each relative bearing with respect to a forward direction of the vehicle 10, based on the display status of the detected traffic signal.

In the present embodiment, the proceedable certainty degree calculation unit 31 uses, as the classifier, a deep neural network (DNN) that is pre-trained to calculate a certainty degree of each kind of an object to be detected in each of a plurality of areas in the image, and, for the area in which the traffic signal is displayed, to output a proceedable certainty degree of each relative bearing with respect to the forward direction of the vehicle 10.

Figure 4:
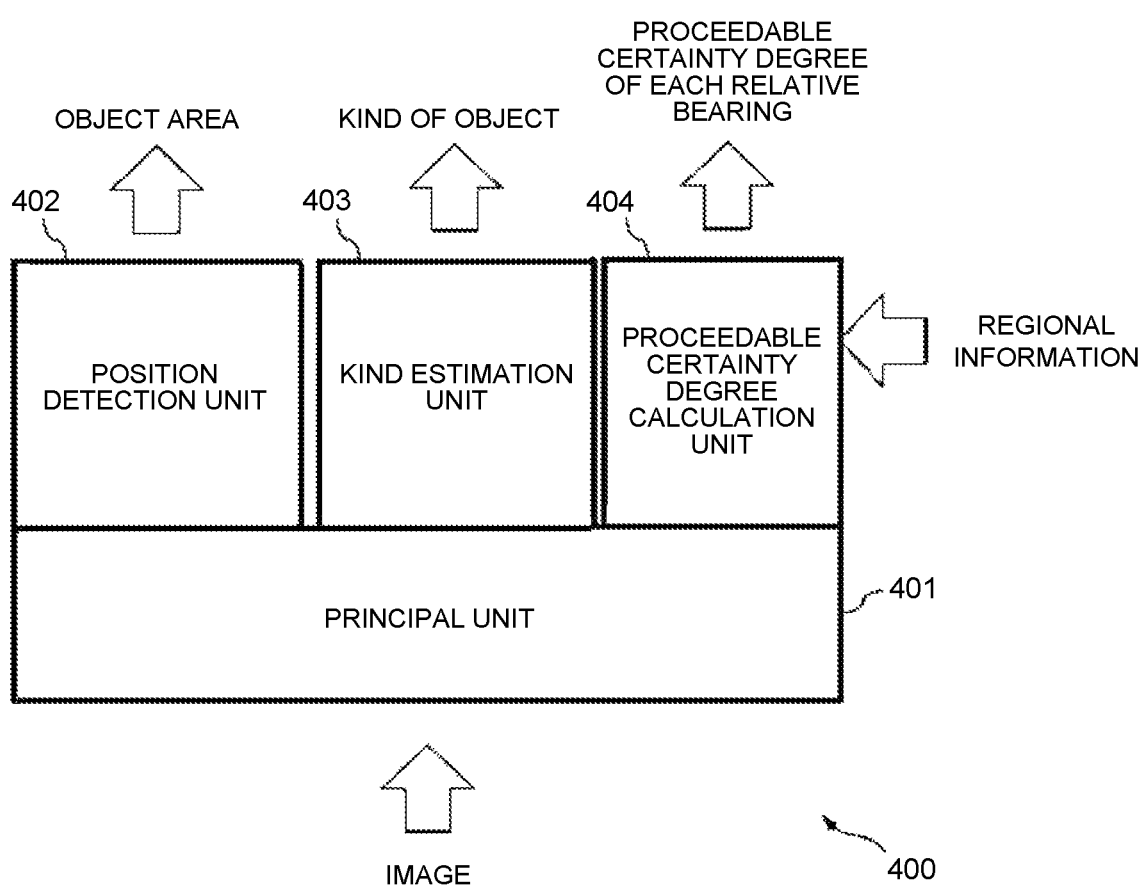
FIG. 4 is a diagram illustrating one example of a configuration of a Deep Neural Network used as a classifier.

FIG. 4 is a diagram illustrating one example of a configuration of the DNN used as the classifier. The DNN 400 includes a principal unit 401 provided on an input side into which an image is input, a position detection unit 402, a kind estimation unit 403, and a proceedable certainty degree calculation unit 404 that are provided to an output side closer than the principal unit 401 is to the output side. Based on the output from the principal unit 401, the position detection unit 402 detects, in the image, a circumscribed rectangle of an area in which the object to be detected is displayed. Based on the output from the principal unit 401, the kind estimation unit 403 estimates a kind of the object displayed on the area detected by the position detection unit 402. Based on the output from the principal unit 401, the proceedable certainty degree calculation unit 404 calculates, for the detected traffic signal, the proceedable certainty degree of each relative bearing with respect to the forward direction of the vehicle 10. Two or more of the position detection unit 402, the kind estimation unit 403, and the proceedable certainty degree calculation unit 404 may be integrally formed.

The principal unit 401 can be, for example, a convolutional neural network (CNN) having a plurality of layers connected in series from the input side, to the output side. The plurality of layers include two or more convolutional layers. Furthermore, the plurality of layers included in the principal unit 401 may include a pooling layer provided to each of one or more convolutional layers. In addition, the plurality of layers included in the principal unit 401 may include one or more fully connected layers. For example, the principal unit 401 can have a configuration similar to that of a foundational layer of a single shot multi-box detector (SSD). In this case, similar to a VGG-16, the principal unit 401 may consist of, in order from the input side, two convolution layers, a pooling layer (hereinafter, simply referred to as a pooling layer) executing a max pooling (that is, outputting a maximum value of n×n inputs), two convolution layers, a pooling layer, three convolution layers, a pooling layer, three convolution layers, a pooling layer, three convolution layers, a pooling layer, and three fully connected layers. Alternatively, the principal unit 401 may be configured according to other CNN architectures, such as a VGG-19, art AlexNet and a Network-In-Network.

When the image is input, the principal unit 401 executes calculation on the image on each layer, and outputs a feature map calculated from the image.

The feature map output from the principal unit 401 is input into each of the position detection unit 402, the kind estimation unit 403, and the proceedable certainty degree calculation unit 404. Each of the position detection unit 402, the kind estimation unit 403, and the proceedable certainty degree calculation unit 404 can be, for example, a CNN having a plurality of layers connected in series from the input side to the output side. For each of the position detection unit 402, the kind estimation unit 403, and the proceedable certainty degree calculation unit 404, the plurality of layers included in the CNN includes two or more convolutional layers. Further, for each of the position detection unit 402, the kind estimation unit 403, and the proceedable certainty degree calculation unit 404, the plurality of layers included in the CNN may include a pooling layer provided to each of one or more convolutional layers. In addition, the convolution layer and the pooling layer included in the CNN may be shared by two or more of the position detection unit 402, the kind estimation unit 403, and the proceedable certainty degree calculation unit 404. Moreover, for each of the position detection unit 402, the kind estimation unit 403, and the proceedable certainty degree calculation unit 404, the plurality of layers may include one or more fully connected layers. In this case, the fully connected layer may be provided closer to the output side than each convolution layer is to the output side. Further, the output from each convolutional layer may be directly input into the fully connected layer. In addition, regional information indicating a region in which the vehicle 10 is traveling may be input into at least one of the fully connected layers of the position detection unit 402, the kind estimation unit 403, and the proceedable certainty degree calculation unit 404. The regional information is set, for example, so that a relationship between a display status of the traffic signal and a direction in which a vehicle can proceed has a different value depending on the region (for example, when the region in which the vehicle 10 is traveling is Japan, a value is set to 1, and when the region, in which the vehicle 10 is traveling is the United States, the value is set to 2). Moreover, for example, the proceedable certainty degree calculation unit 31 specifies a region including a current position of the vehicle 10, received by the positioning information receiver 3, with reference to the map information, and generates the regional information by referring to the specified region, and a table indicating a correspondence between each region and its regional information. Further, such a table is stored in the memory 22 in advance. In addition, an output layer of the kind estimation unit 403 can be a softmax layer that calculates, based on a softmax function, the certainty degree of each kind of the object to be detected, or can be a sigmoid layer that calculates, based on a sigmoid function, the certainty degree of each kind of the object to be detected. Similarly, an output layer of the proceedable certainty degree calculation unit 404 can be a softmax layer that calculates, based on a softmax function, the proceedable certainty degree of each relative bearing, or can be a sigmoid layer that calculates, based on a sigmoid function, the proceedable certainty degree of each relative bearing.

The position detection unit 402 and the kind estimation unit 403 are trained to output the certainty degree of each kind of the object to be detected for, for example, each of areas having various positions, sizes, and aspect ratios in the image. Thus, when the image is input, the classifier 400 outputs the certainty degree of each kind of the object to be detected for, for example, each of areas having various positions, sizes, and aspect ratios in the image. The proceedable certainty degree calculation unit 31 detects an area in which a certainty degree of any kind of object is equal to or higher than a predetermined certainty degree threshold value (for example, 0.8 to 0.9) as an object area in, which that kind of object is displayed. In addition, a plurality of object areas in which the same kind of object is displayed is detected in one image and the object areas overlap at least partially, the proceedable certainty degree calculation unit 31 may output only the area in which the certainty degree is the maximum among the plurality of object areas. Moreover, regarding the traffic signal, the classifier 400 may regard the traffic lights included in the traffic signal as one kind of object, and calculate the certainty degree of the traffic lights. Therefore, the proceedable certainty degree calculation unit 31 detects, as an object area in which the traffic lights are displayed, an area in which the certainty degree of the traffic lights is equal to or higher than a predetermined certainty degree threshold value.

Meanwhile, the proceedable certainty degree calculation unit 404 is pre-trained, for example, to output the proceedable certainty degree of each, relative bearing with respect to the forward direction of the vehicle based on a lighting condition of each traffic light of the traffic signal, the road sign installed around the traffic signal, and the environment around the traffic signal which are displayed in the image. Thus, when the image is input, the classifier 400 outputs, in each area in which the traffic light of the traffic signal is detected by the position detection unit 402 and the kind estimation unit 403, the proceedable certainty degree of each relative bearing for the traffic light displayed, via the proceedable certainty degree calculation unit 404. As such, when the proceedable certainty degree of a relative bearing for each traffic light is calculated, the proceedable direction detection apparatus can accurately detect the direction in which the vehicle 10 can proceed even when two or more of a plurality of traffic lights included in one traffic signal are lit.

Figure 5:
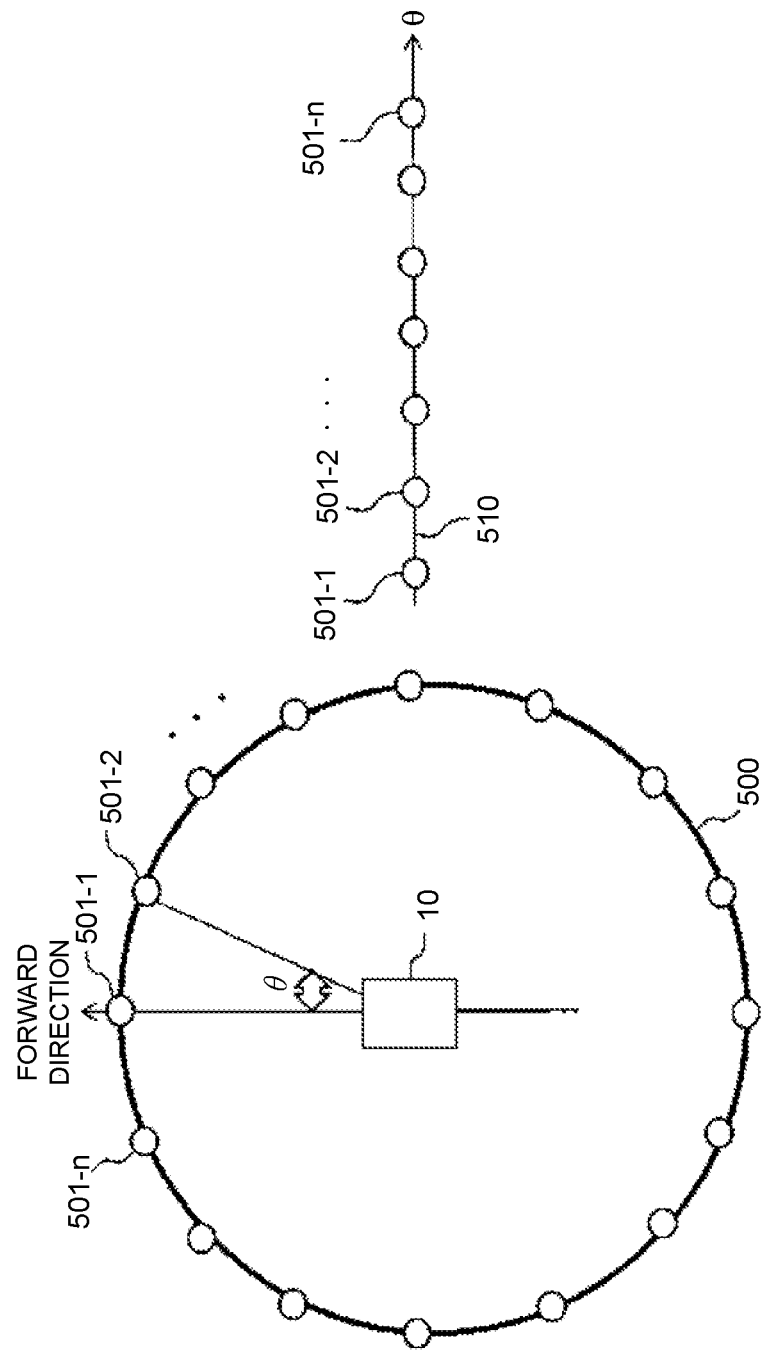
FIG. 5 is a schematic diagram illustrating a proceedable certainty degree of each relative bearing with respect to a forward direction of a vehicle, output by the classifier.

FIG. 5 is a schematic diagram illustrating the proceedable certainty degree of each relative bearing, output by the proceedable certainty degree calculation unit 404. As illustrated in FIG. 5, the relative bearing θ with respect to the forward direction of the vehicle 10 is expressed as an angle between a line in forward direction of the vehicle 10 and a line connecting the vehicle 10 to the point on the circle 500 centered on the vehicle 10. Thus, in the present embodiment, the range of values that the relative bearing θ can take (for example, −180° to 180°, where the clockwise direction is positive with respect to the forward direction) is divided into n angular segments having a predetermined angle (for example, 5° to 30°), and one of representative points 501-1, 501-2, . . . to 501-n is set for each angular segment. In addition, each of the representative points 501-1 to 501-n can be a predetermined point in its corresponding angular segment, for example, a middle point of is its corresponding angular segment. Further, the proceedable certainty degree calculation unit 404 outputs the proceedable certainty degree of each of the representative points 501-1 to 501-n on a polar coordinate axis 510 on the one-dimensional space when the relative bearing θ is expressed in polar coordinates. Moreover, the relative bearing θ is not limited to being based on the forward direction of the vehicle 10, and may be set as a bearing, with respect to any direction based on the vehicle 10.

Figure 6:
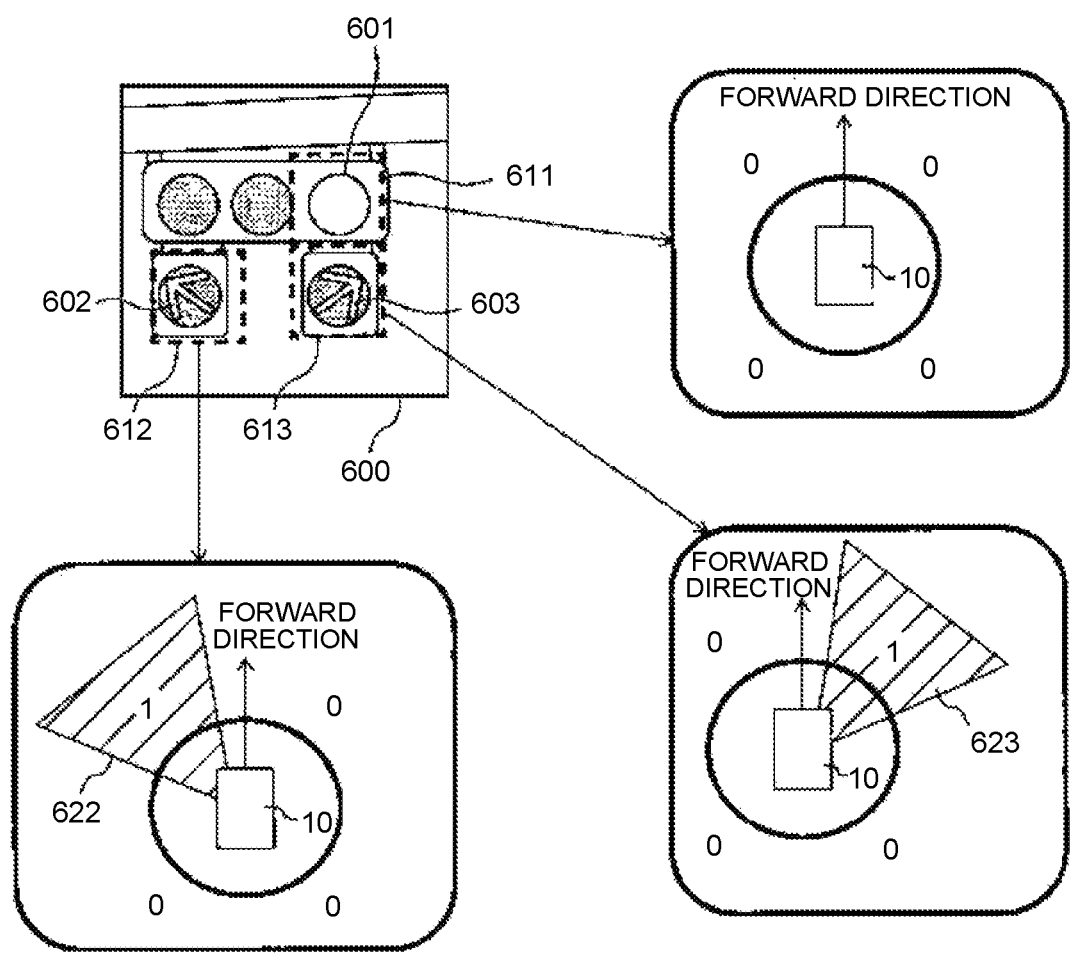
FIG. 6 is a diagram illustrating one example of a teaching image used to teach the classifier illustrated in FIG. 4.

FIG. 6 is a diagram illustrating one example of an image (a teaching image) included in teaching data used for training of the classifier 400 illustrated in FIG. 4. The teaching image 600 displays a traffic signal to be detected on which the traffic lights 601 to 603 are lit. Of the lit traffic lights 601 to 603, the traffic light 601 emits a red light, the traffic light 602 displays a diagonal arrow pointing to the upper left, and the traffic light 603 displays a diagonal arrow pointing to the upper right.

In the teaching image 600, circumscribed rectangles 611 to 613 representing the areas in which the traffic lights 601 to 603 are displayed, respectively, and the kinds of objects to be detected for the areas of the traffic lights (in this example, the traffic signal) are tagged on the traffic lights 601 to 603, respectively. Furthermore, in the teaching image 600, the ranges of the direction in which the vehicle 10 can proceed are tagged, on the traffic lights 601 to 603, respectively. In other words, a value (for example, 1) indicating that the vehicle 10 can proceed, is set for the representative point of each angular segment included in the range in which the vehicle 10 can proceed, and a value (for example, 0), indicating that the vehicle 10 cannot proceed, is set for the representative point of each angular segment not included in the range in which the vehicle 10 can proceed. In this example, since the traffic light 601 emits a red light, there is no direction in which the vehicle 10 can proceed, and a value indicating that the vehicle 10 cannot proceed is set for the representative points of all the angular segments. Further, since the traffic light 602 displays a diagonal arrow pointing to the upper left, a range 622 of the direction in which the vehicle 10 can proceed is set in the diagonal forward-left direction of the vehicle 10 for the traffic light 602. In addition, a value indicating that the vehicle 10 can proceed is set for the representative point of each angular segment included in the range 622, and a value indicating that the vehicle 10 cannot proceed is set for the representative point of each angular segment not included in the range 622. Further, since the traffic light 603 displays a diagonal arrow pointing to the upper right, a range 623 of the direction in which the vehicle 10 can proceed is set in the diagonal forward-right direction of the vehicle 10 for the traffic light 603. In addition, a value indicating that the vehicle 10 can proceed is set for the representative point of each angular segment included in the range 623, and a value indicating that the vehicle 10 cannot proceed is set for the representative point of each angular segment not included in the range 623.

Moreover, in the same manner as the traffic light 601 emitting a red light, a traffic light emitting yellow light may be tagged to indicate that there is no direction in which the vehicle 10 can proceed. In addition, a traffic light emitting a green light may be tagged to indicate that the vehicle 10 can proceed in all directions.

Figure 7A:
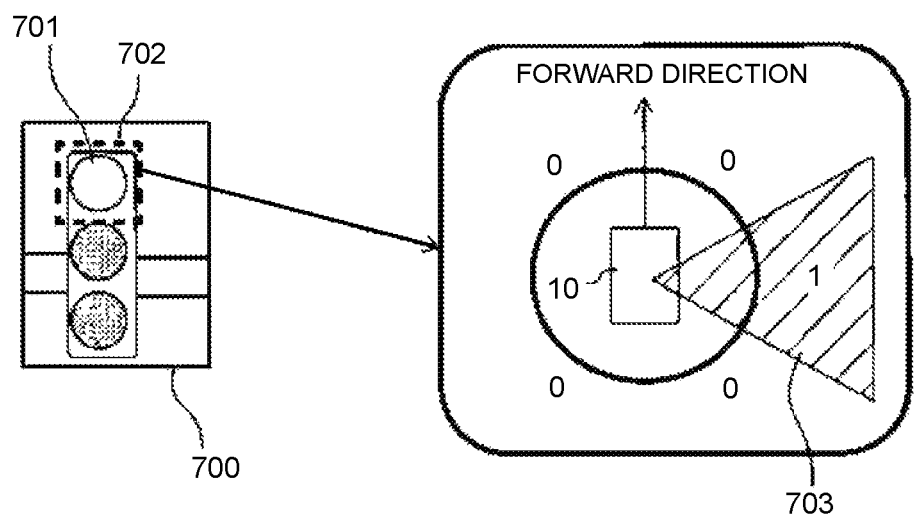
FIG. 7A is a diagram illustrating another example of a teaching image used to teach the classifier illustrated in FIG. 4.
Figure 7B:
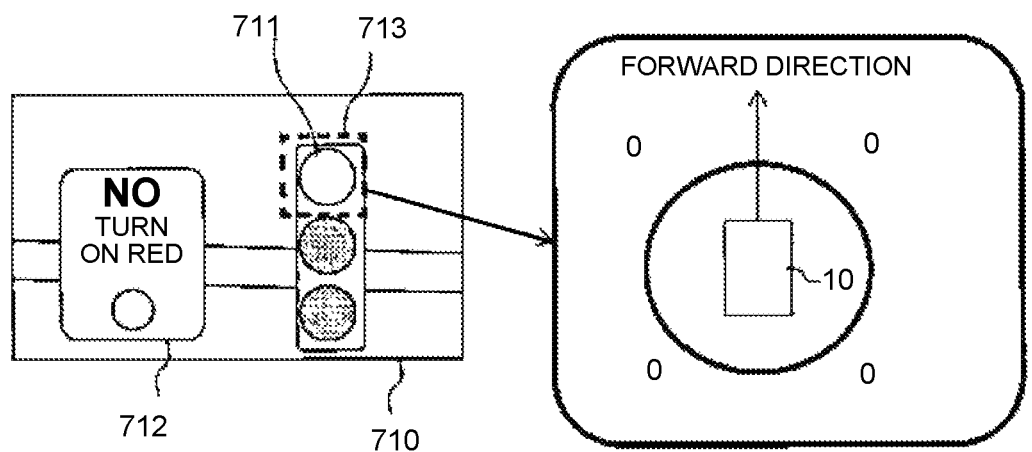
FIG. 7B is a diagram illustrating another example of the teaching image used to teach the classifier illustrated in FIG. 4.

Each of FIGS. 7A and 7B is a diagram illustrating another example of a teaching image used for training the classifier 400 illustrated in FIG. 4. The teaching image 700 illustrated in FIG. 7A and the teaching image 710 illustrated in FIG. 7B are used when determining whether the vehicle 10 is prohibited from proceeding in a specific direction or whether the vehicle 10 is allowed to proceed in the specific direction, even when the traffic signal emits a red light, is different depending on whether there is a road sign indicating that the vehicle cannot proceed in the specific direction as in the United States.

The teaching image 700 illustrated in FIG. 7A displays a traffic signal to be detected on which a traffic light 701 emitting a red light is lit. In this case, on the teaching image 700, a circumscribed rectangle 702 representing an area in which the traffic light 701 is displayed, and the kind of the object to be detected (in this example, the traffic signal) for the area in which the traffic light 701 is displayed are tagged. Furthermore, in the teaching image 700, a range 703 of the direction in which the vehicle 10 can proceed is tagged for the traffic light 701. In this example, the range 703 is set in the right direction of the vehicle 10 (in other words, turning right is possible). Then, a value indicating that the vehicle 10 can proceed is set for the representative point of each angular segment included in the range 703, and a value indicating that the vehicle 10 cannot proceed is set for the representative point of each angular segment not included in the range 703.

On the other hand, the teaching image 710 illustrated in FIG. 7B displays a traffic signal including a traffic light 711 emitting a red light and a road sign 712 representing that turning right is prohibited when the traffic signal emits a red light. In the same manner as in the case of FIG. 7A, on the teaching image 710, a circumscribed rectangle 713 representing an area in which the traffic light 711 is displayed, and the kind of the object to be detected for the area in which the traffic light 711 is displayed are tagged. Furthermore, since there is the road sign 712 in the teaching image 710, there is no direction in which the vehicle 10 can proceed. Therefore, a value indicating that the vehicle 10 cannot proceed is set for the representative points of all, the angular segments in the teaching image 710.

Figure 8A:
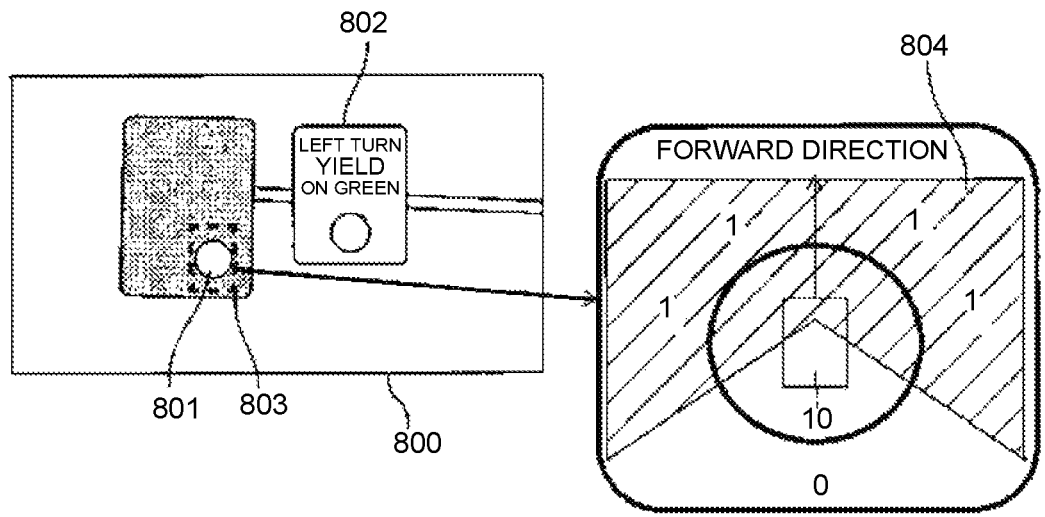
FIG. 8A is a diagram illustrating yet another example of a teaching image used to teach the classifier illustrated in FIG. 4.
Figure 8B:
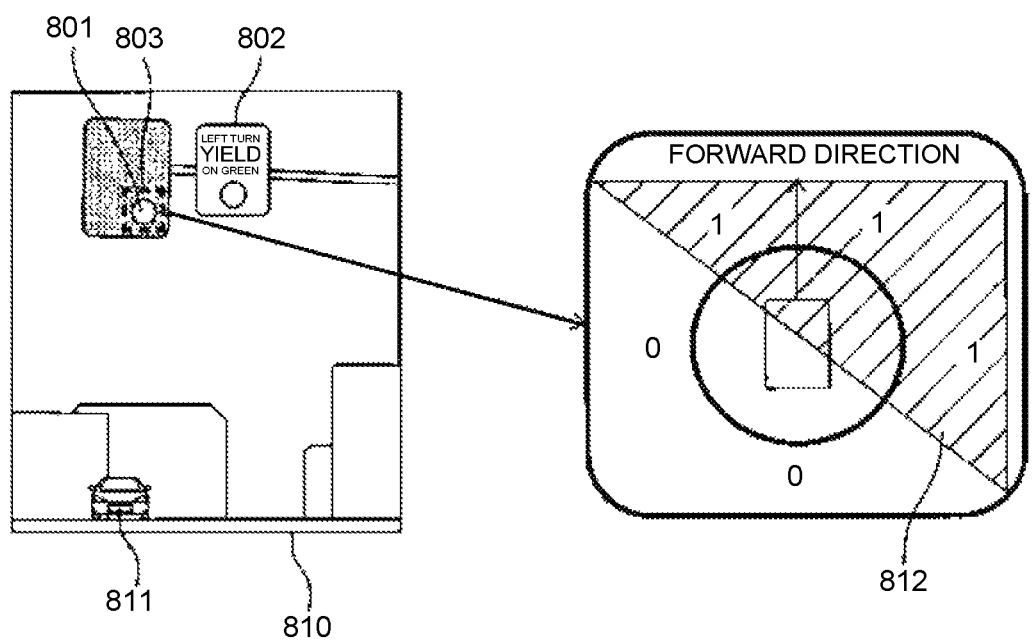
FIG. 8B is a diagram illustrating yet another example of the teaching image used to teach the classifier illustrated in FIG. 4.

Each of FIGS. 8A and 8B is a diagram illustrating yet another example of a teaching image used for training the classifier 400 illustrated in FIG. 4. A teaching image 800 illustrated in FIG. 8A and a teaching image 810 illustrated in FIG. 8B are used when determining whether the vehicle 10 is prohibited from proceeding in a specific direction or the vehicle 10 is allowed to proceed in the specific direction, even when the traffic signal emits a green light is different depending on whether there is a vehicle coming from the opposite direction and a specific road sign.

The teaching image 800 illustrated in FIG. 8A displays a traffic signal including a traffic light 801 emitting a green light, and a road sign 802 representing that turning left is prohibited when there is a vehicle coming from the opposite direction. In this case, on the teaching image 800, a circumscribed rectangle 803 representing an area in which the traffic light 801 is displayed, and the kind of the object to be detected (in this example, the traffic signal) for the area in which the traffic light 801 is displayed are tagged. Furthermore, in the teaching image 800, a range 804 of the direction in which the vehicle 10 can proceed is tagged far the traffic light 801. In this example, the range 804 is set in the right and left directions of the vehicle 10 as well as the front direction of the vehicle. Then, a value indicating that the vehicle 10 can proceed is set for the representative point of each angular segment included in the range 804, and a value indicating that the vehicle 10 cannot proceed is set for the representative point of each angular segment not included in the range 804.

On the other hand, the teaching image 810 illustrated in FIG. 8B displays a traffic signal including a traffic light 801 emitting a green light, a road sign 802, and a vehicle 811 coming from the opposite direction. In the same manner as in the case of FIG. 8A, on the teaching image 810, a circumscribed rectangle 803 representing an area in which the traffic light 801 is displayed, and the kind of the object to be detected for the area in which the traffic light 801 is displayed are tagged. Furthermore, since there is the vehicle 811 coming from the opposite direction in the teaching image 810, a range 812 including the front and right directions of the vehicle 10 is tagged as directions in which, the vehicle 10 can proceed, for the traffic light 801. Then, a value indicating that the vehicle 10 can proceed is set for the representative point of each angular segment included in the range 812, and a value indicating that the vehicle 10 cannot proceed is set for the representative point of each angular segment not included in the range 812.

By using a number of teaching images as illustrated in FIGS. 6, 7A, 7B, 8A, and 8B, the classifier 400 is trained according to a training method such as the error backpropagation algorithm so that, for example, a cost function shown in the following equation can be minimized:

[Equation 1]

$$L = L_{conf} + \alpha L_{loc} + \beta L_{direction} \quad (1)$$

Here, $\alpha$ and $\beta$ are weighting factors, and are set to, for example, 0.5 to 2. In addition, a variable $L_{conf}$ represents an error between the certainty degree output by the kind estimation unit 403 of the classifier 400 and a certainty degree set for the object displayed in the teaching image. Moreover, a variable $L_{loc}$ represents an error between the circumscribed rectangle of the object displayed in the teaching image and the circumscribed rectangle of the object output by the position detection unit 402 of the classifier 400. Further, the variable $L_{conf}$ and the variable $L_{loc}$ can be the same as a variable representing an error between certainty degrees and a variable representing an error between circumscribed rectangles of an object, which are used in the cost function when training on the SSD. In addition, a variable $L_{direction}$ represents an error between a distribution of the proceedable certainty degree of each relative bearing with respect to the traffic signal displayed in the teaching image, and a distribution of the proceedable certainty degree of each relative bearing output by the proceedable certainty degree calculation unit 404 of the classifier 400. For example, the variable $L_{direction}$ is calculated according to the following equation, using cross entropy between the proceedable certainty degree set for the traffic signal displayed in the teaching image, and the proceedable certainty degree output by the proceedable certainty degree calculation unit 404 of the classifier 400 of each relative bearing:

[Equation 2]

$$L_{direction} = \sum_{j} \sum_{i} (P_{ij} \log Q_{ij} + (1 - P_{ij}) \log(1 - Q_{ij})) \quad (2)$$

Here, $P_{ij}$ is a proceedable certainty degree of a relative bearing i on a j-th teaching image, and $Q_{ij}$ is a proceedable certainty degree of a relative bearing i, output by the proceedable certainty degree calculation unit 404, when the j-th teaching image, is input into the classifier 400. In addition, a variable $L_{direction}$ may be calculated according to the Kullback-Leibler divergence between the proceedable certainty degree $P_{ij}$ set for the teaching image and the proceedable certainty degree $Q_{ij}$ output by the proceedable certainty degree calculation unit 404.

By using the classifier 400 trained as described above, the proceedable certainty degree calculation unit 31 can accurately assess whether the vehicle 10 can proceed for each relative bearing based on the display status of the traffic signal displayed in the image.

For each of the traffic lights of the detected traffic signal, the proceedable certainty degree calculation unit 31 outputs, to the proceedable direction determination unit 32, a proceedable certainty degree of a relative bearing for the traffic light, and information indicating a location and a range of an area in which the traffic light is included. Furthermore, the proceedable certainty degree calculation unit 31 may output, to the driving planning unit 33, a kind of a detected object other than the traffic signal, and information indicating a location and a range of an area in which the object is included.

The proceedable direction determination unit 32 determines the direction in which the vehicle 10 can proceed, based on the proceedable, certainty degree of a relative bearing for each traffic light in the detected traffic signal.

A plurality of traffic signals are displayed in one image. In such a case, the proceedable direction determination unit 32 may determine the direction in which the vehicle 10 can proceed, based on a traffic signal, closest to the vehicle 10 and for a lane on which the vehicle 10 is traveling. Thus, when the plurality of traffic lights are detected from one image, for each combination of two of the detected plurality of traffic lights, the proceedable direction determination unit 32 calculates a distance between the centers of the areas in which two traffic lights are included, respectively. When the distance between the centers of the areas in which two traffic lights are included respectively is equal to or less than a predetermined threshold value, the proceedable direction determination unit 32 determines that the two traffic lights are included in the same traffic signal. Moreover, when the difference between the sizes of the areas in which two traffic lights respectively are included is larger than the predetermined threshold value, the proceedable direction determination unit 32 may determine that the two traffic lights are included in different traffic signals. Alternatively, the proceedable direction determination unit 32 may group the traffic lights for each traffic signal according to a predetermined clustering method.

By executing the above process, the proceedable direction determination unit 32 groups the traffic lights detected in the image for each traffic signal. When there is only one group of traffic lights, that is, when only one traffic signal is detected, the proceedable direction determination unit 32 determines the proceedable direction in which the vehicle 10 can proceed, based on the group.

On the other hand, when there are a plurality of groups of traffic lights, that is, when a plurality of traffic signals are detected, the proceedable direction determination unit 32 selects, from among the groups, the group having the highest average value of the sizes of areas in which the traffic lights are included respectively as the traffic signal closest to the vehicle 10. Alternatively, the proceedable direction determination unit 32 may select, from among the groups, the group closest to an upper end of the image as the traffic signal closest to the vehicle 10.

In addition, when a lane marking is detected from the image, the proceedable direction determination unit 32 may select a group based on the relative positional relationship between the lane marking and each group. For example, the proceedable direction determination unit 32 estimates that an area between a lane marking located closest to the center of the image among the lane markings located on the left side of the center of the image, and a lane marking located closest to the center of the image among the lane markings located on the right side of the center of the image is the lane on which the vehicle 10 travels. The proceedable direction determination unit 32 selects groups in which, a line descending vertically downward from the horizontal center of the groups intersects with a lane in which the vehicle 10 travels. Then, the proceedable direction determination unit 32 selects, from among the selected groups, the group having the highest average value of the sizes of areas in which the traffic light is included respectively, or the group closest to the upper end of the image, as the traffic signal closest to the vehicle 10.

The proceedable direction determination unit 32 compares the certainty degree threshold value with a proceedable certainty degree of each relative hearing for each traffic light included in the selected group. Then, the proceedable direction determination unit 32 selects a relative bearing in which the proceedable certainty degree of each traffic light is equal to or higher than the certainty degree threshold value, and determines a set of the selected relative hearings for each traffic light as the direction in which the vehicle 10 can proceed.

Figure 9:
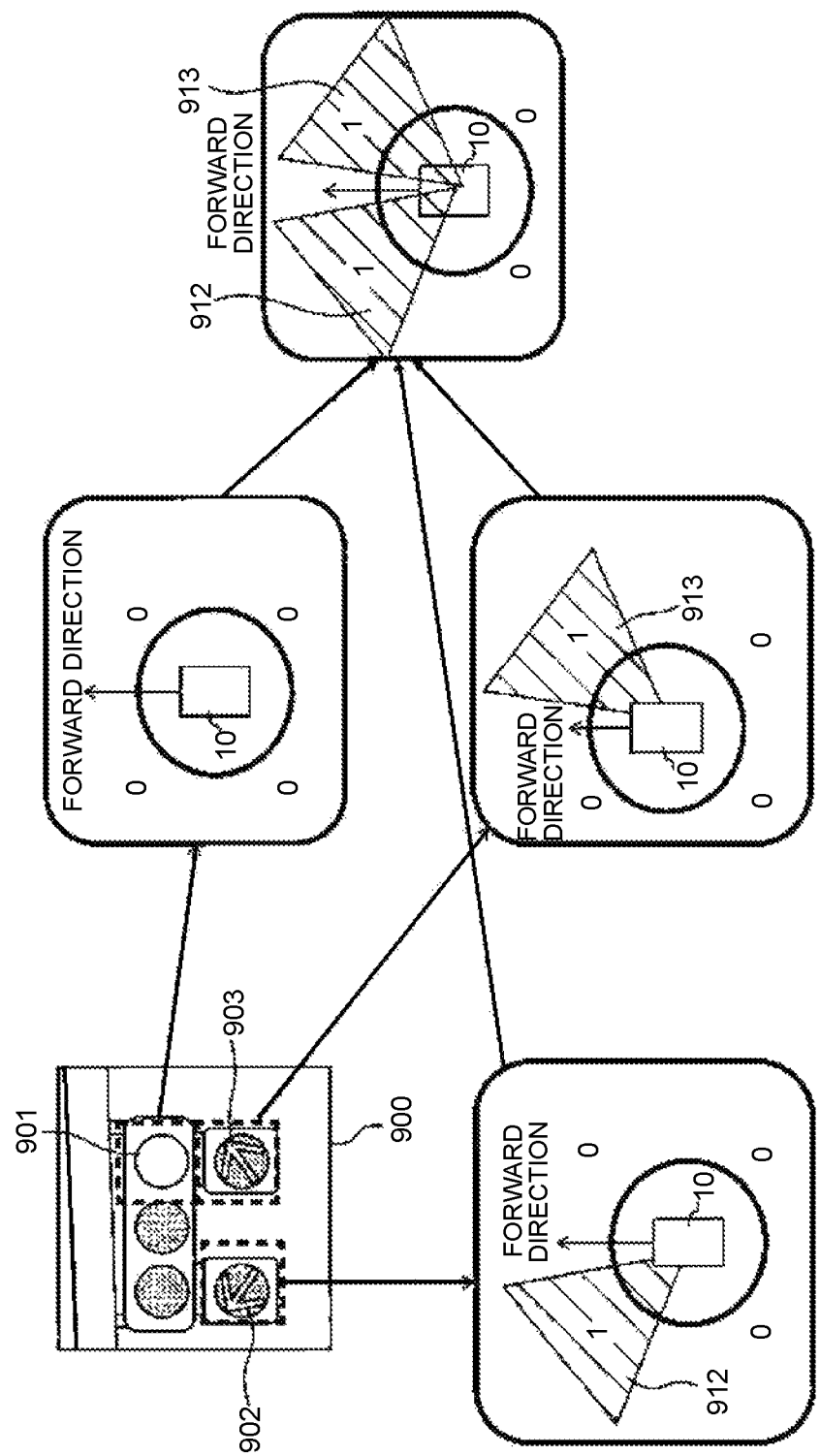
FIG. 9 is a diagram illustrating one example of a result of detecting a relative bearing in which the vehicle can proceed.

FIG. 9 is a diagram illustrating one example of a result of detecting the relative bearing in which the vehicle 10 can proceed. As in the teaching image 600 illustrated in FIG. 6, in the image 900 illustrated in FIG. 9, a traffic light 901 emitting, a red light, a traffic light 902 displaying a diagonal arrow pointing to the upper left, and a traffic light 903 displaying a diagonal arrow pointing to the upper right are detected from one traffic signal. For the traffic light 902, a range 912 of the forward-left diagonal direction from the vehicle 10 is detected as the range of the relative bearing in which the vehicle 10 can proceed. Further, for the traffic light 903, a range 913 in the forward-right diagonal direction from the vehicle 10 is detected as the range of the relative bearing in which the vehicle 10 can proceed. On the other hand, for the traffic light 901, a relative bearing in which the vehicle 10 can proceed is not detected. In this case, a set of relative bearings included in the range 912 or 913 is specified as the direction in which vehicle 10 can proceed.

The proceedable direction determination unit 32 notifies the driving planning unit 33 of the direction in which the vehicle 10 can proceed.

The driving planning unit 33 generates one or more scheduled traveling routes of the vehicle 10, based on the relative bearing in which the vehicle 10 can proceed. The scheduled traveling route is represented, for example, as a set of target positions of the vehicle 10 at each time from the current time to a predetermined time later.

For example, the driving planning unit 33 refers to the current position of the vehicle 10 acquired by the positioning information receiver 3 and the map information stored in the memory 22, and determines a proceeding direction of the vehicle 10 so that the vehicle 10 can travel according to the traveling route of vehicle 10 generated by the navigation system. For example, when the vehicle 10 is, approaching an intersection, and the traveling route indicates that the vehicle 10 turns right at the intersection, the driving planning unit 33 determines the proceeding direction of the vehicle 10 so as to turn the vehicle 10 to the right.

The driving planning unit 33 compares the determined proceeding direction of the vehicle 10 with the direction in which the vehicle 10 can proceed. When the proceeding direction of the vehicle 10 matches the direction in which the vehicle 10 can proceed, that is, when the proceeding, direction of the vehicle 10 is included in the set of relative bearings in which the vehicle 10 can proceed, the driving planning unit 33 generates a scheduled traveling route so that the vehicle 10 can proceed along the proceeding direction. On the other hand, when the proceeding direction of the vehicle 10 does not match the direction in which the vehicle 10 can proceed, the driving planning unit 33 generates a scheduled traveling route so as to temporarily stop or decelerate the vehicle 10. Here, the driving planning unit 33 may refer to, for example, the current position of the vehicle 10 and the map information, and generate the scheduled traveling route so as to stop the vehicle 10 at a predetermined position before the intersection that is closest to the current position of the vehicle 10 among the intersections on which traffic signals are installed, in the proceeding direction of the vehicle 10.

Furthermore, when an object around the vehicle 10 is detected from the image, the driving planning unit 33 may generate the scheduled traveling route of the vehicle 10 so that the vehicle 10 does not collide with the object. For example, each time an image is received from the camera 2, the driving planning unit 33 converts the received image into a bird's-eye view image by executing a viewpoint conversion process, using information such as an attachment position of the camera 2 to the vehicle 10. Then, the driving planning unit 33 tracks the object detected from each image by executing a tracking process for a series of bird's-eye view images, using the Kalman filter or the like, and from a trajectory acquired by a result of the tracking, estimates a predicted trajectory of each object, up to a predetermined time later. Based on the predicted trajectory of each object that is being tracked, the driving planning unit 33 generates the scheduled traveling route of the vehicle 10 so that a predicted distance between the vehicle 10 and each of the objects being tracked up to a predetermined time later can be equal to or higher than a predetermined distance for any object. Further, the driving planning unit 33 may generate a plurality of scheduled traveling mutes. In this case, the driving planning unit 33 may select a route having the smallest sum of absolute values of acceleration of the vehicle 10, from among the plurality of scheduled traveling routes.

The driving planning unit 33 notifies the vehicle control unit 34 of the generated scheduled traveling route.

The vehicle control unit 34 controls each unit of the vehicle 10 so that the vehicle 10 can travel along the notified scheduled traveling route. For example, the vehicle control unit 34 calculates the acceleration of the vehicle 10 based on the notified scheduled traveling route, and the current speed of the vehicle 10 measured by a vehicle speed sensor (not shown), and sets an accelerator position angle or a brake amount to meet the calculated acceleration. Then, the vehicle control unit 34 calculates a fuel injection amount based on the set accelerator position angle, and outputs a control signal corresponding to the fuel, injection amount to a fuel injection device of an engine of the vehicle 10. Alternatively, the vehicle control unit 34 outputs a control signal corresponding to the set brake amount to a brake of the vehicle 10.

Furthermore, when changing the course of the vehicle 10 so that the vehicle 10 can travel along the scheduled traveling route, the vehicle control unit 34 calculates a steering angle of the vehicle 10 based on the scheduled traveling route, and outputs a control signal corresponding to the steering angle to an actuator (not shown) that controls steering wheels of the vehicle 10.

Figure 10:
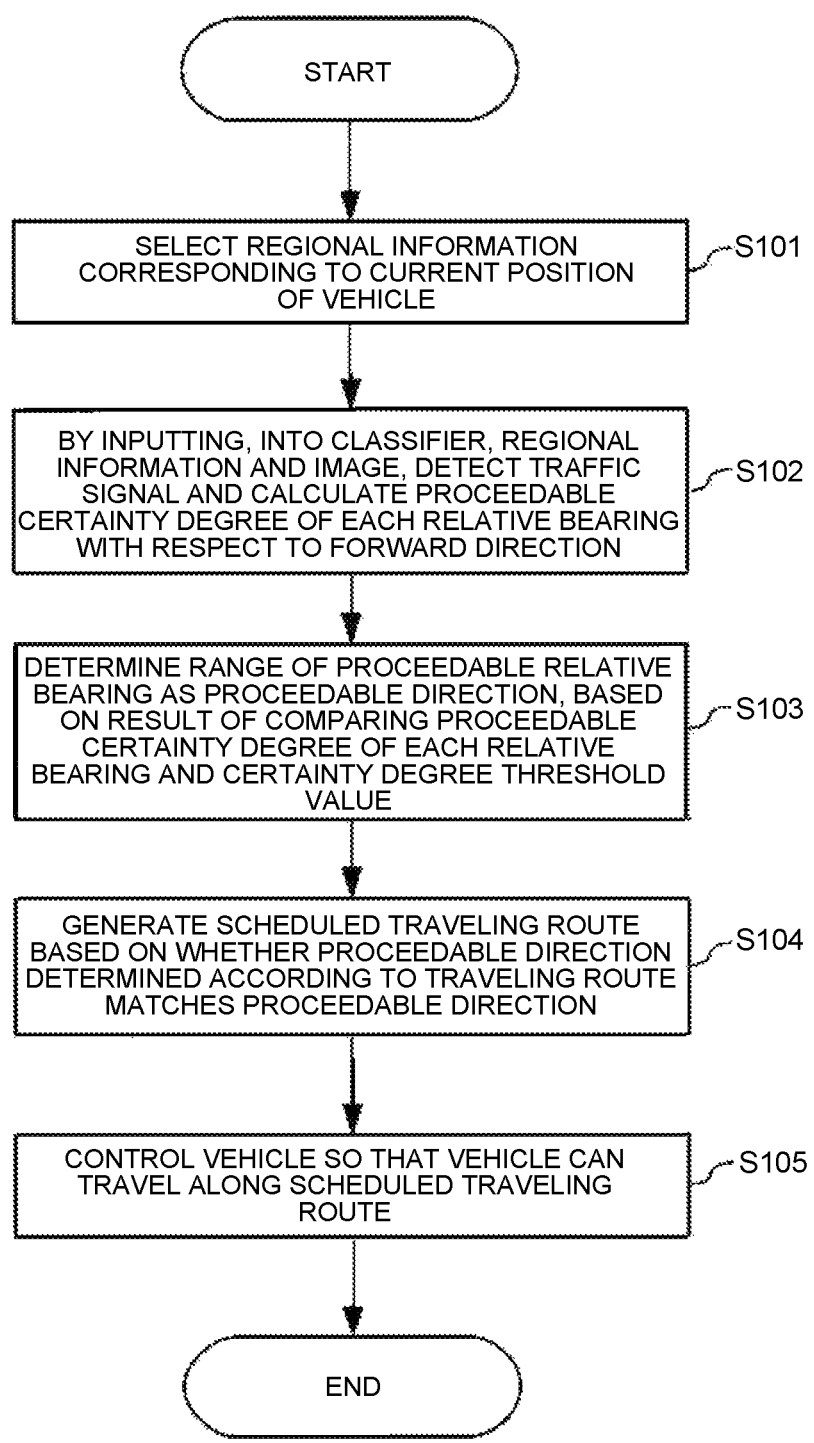
FIG. 10 is an operational flowchart of the vehicle control process that includes the proceedable direction detecting process.

FIG. 10 is an operational flowchart of a vehicle control process including a proceedable direction detection process, which is executed by the processor 23. Each time an image is received from the camera 2, the processor 23 executes the vehicle control process according to the operational flowchart illustrated in FIG. 10. In addition, in the operational flowchart illustrated in FIG. 10, the processes of steps S101 to S103 correspond to the proceedable direction detection process.

The proceedable certainty degree calculation unit 31 of the processor 23 selects regional information corresponding to the current position of the vehicle 10, based on the current position of the vehicle 10, which is specified by the positioning information that is acquired by the positioning information receiver 3 (step S101). Then, by inputting, into the classifier, the regional information and the image acquired by the camera 2, the proceedable certainty degree calculation unit 31 detects the traffic signal from the image, and calculates a proceedable certainty degree of each relative bearing with respect to the forward direction of the vehicle 10 based on the display status of the detected traffic signal (step S102).

The proceedable direction determination unit 32 of the processor 23 compares the proceedable certainty degree of each relative bearing and the certainty degree threshold value, and based on, a result of the comparison, determines the range of the relative bearing in which the vehicle 10 can proceed, as the direction in which the vehicle 10 can proceed (step S103).

The driving planning unit 33 of the processor 23 determines the proceeding direction of the vehicle 10, based on the traveling route of the vehicle 10 and the current position of the vehicle 10, determines whether the proceeding direction matches the direction in which the vehicle 10 can proceed, and based on a result of the determination, generates a scheduled traveling route of the vehicle 10 (step S104). Then, the vehicle control unit 34 of the processor 23 controls the vehicle 10 so that the vehicle 10 can travel along the scheduled traveling route (step S105). Thereafter, the processor 23 ends the vehicle control process.

As described above, the proceedable direction detection apparatus inputs the surrounding image of the vehicle, which is acquired by the camera mounted on the vehicle, to the classifier pre-trained to output the proceedable certainty degree of each relative bearing with respect to a predetermined direction relative to the vehicle based on the display status of the traffic signal, such as the lighting condition of the traffic signal, a road sign installed around the traffic signal, and the environment around the traffic signal, and acquires, using, the classifier, the proceedable certainty degree of each relative bearing. Moreover, the proceedable direction detection apparatus determines the direction in which the vehicle can proceed by comparing the certainty degree threshold value with the proceedable certainty degree of each relative bearing. Specifically, the proceedable direction detection apparatus can determine the direction in which the vehicle can proceed as a set of relative bearings with respect to a predetermined direction, not simply as the forward direction, the left direction, the right direction, and the like. Therefore, the proceedable direction detection apparatus can accurately detect the proceedable direction in which the vehicle can proceed for various kinds of traffic signals.

According to one modification, the proceedable certainty degree calculation unit 31 may calculate the proceedable certainty degree of each relative direction with respect to a predetermined direction relative to the vehicle 10, using a classifier other than the DNN. For example, the proceedable certainty degree calculation unit 31 may use, as a classifier, a support vector machine (SVM) classifier or an adaBoost classifier, pre-trained to output whether a traffic signal is displayed in a window, by inputting a feature (for example, the histogram of oriented gradients (HOG) or Haar-like feature) amount, calculated from the window set on the image. The proceedable certainty degree calculation unit 31 calculates the feature amount from the window while variously changing the position, size and aspect ratio of the window set on the image, and determines whether the traffic signal is included in the window by inputting the calculated feature amount into the SVM classifier or the adaBoost classifier. The proceedable certainty degree calculation unit 31 acquires the proceedable certainty degree of each relative bearing by inputting the feature amount, calculated from the window that is determined to include the traffic signal, into a classifier pre-trained to output a proceedable certainty degree of a relative bearing, which is prepared for each relative bearing with respect to the forward direction of the vehicle 10. In addition, the classifier can be, for example, a classifier based on the SVM or the adaBoost. Moreover, the feature amount input into the classifier can be based on the HOG or Haar-like feature.

According to another modification, the classifier may be pre-trained to use, for calculation of the proceedable certainty degree, information indicating a kind of a road (for example, a one-way road, a four-lane road) on which the vehicle 10 is traveling, instead of, or along with, the regional information. Furthermore, the classifier may be pre-trained to use, for calculation of the proceedable certainty degree, information indicating a kind of a traffic signal displayed in the map information, instead of, or along with, the regional information. In addition, with reference to the map information stored in the memory 22, the proceedable certainty degree calculation unit 31, specifies the kind of the road which corresponds to the current position of the vehicle 10, acquired by the positioning information receiver 3, and the kind of the traffic signal closest to the vehicle 10 in the proceeding direction of the vehicle 10, and then inputs, into the classifier, the information indicating the specified kind of the road or the traffic signal.

Alternatively, the classifier may be pre-trained to use, for calculation of the proceedable certainty degree, a lighting condition of a stop lamp or a blinker lamp of a vehicle traveling ahead of the vehicle 10, or a change in speed of the vehicle traveling ahead of the vehicle 10, as well as the information on the traffic signal. Here, when a vehicle traveling ahead of the vehicle 10 is detected from the image captured immediately before, or when a vehicle traveling ahead of the vehicle 10, which is tracked by the driving planning unit 33 exists, the lighting condition of the stop lamp or blinker lamp of the vehicle traveling ahead of the vehicle 10 may be input into the classifier, or the change in speed of the vehicle traveling ahead of the vehicle 10, instead of, or along, with, the regional information. Moreover, the classifier may be further pre-trained to detect the stop lamp or the blinker lamp, and discern whether the lamps are being lighted. In this case, the lighting, condition of the stop lamp or blinker lamp of the vehicle traveling ahead of the vehicle 10 can be acquired as the image captured immediately before is input into the classifier. Therefore, since the classifier can use, for calculation of the proceedable certainty degree of each relative bearing, the information on the kind of the road on which the vehicle 10 is traveling, or information on the vehicle traveling ahead of the vehicle 10, it is possible that the proceedable certainty degree of each relative bearing, is acquired more accurately.

Alternatively, the classifier may be specified for each region by being individually trained for each region, using a teaching image in which the traffic light of the region is displayed. In this case, regional information does not have to be input into the classifier. Instead, the memory 22 may store, in advance, parameters for specifying a classifier for the region in which the vehicle 10 is assumed to travel. In this modification, without inputting the regional information into the classifier, the proceedable direction detection apparatus can accurately detect the direction in which the vehicle 10 can proceed based on the display status of the traffic, signal depending on the region in which the vehicle 10 travels.

According to yet another modification, the classifier may be pre-trained to output the proceedable certainty degree of each relative bearing for each traffic signal that includes a plurality of traffic lights.

In addition, a computer program that implements a function of each unit of the processor 23 of the proceedable direction detection apparatus according to the above embodiment or modifications may be provided in the form of being recorded on a computer-readable portable recording medium, such as a semiconductor memory, a magnetic recording medium or an optical recording medium.

As described above, those skilled in the art can make variations and modifications to the embodiment to be executed within the scope of the present disclosure.

What is claimed is:

1. A proceedable direction detection apparatus comprising a processor, wherein the processor is configured to:
   input an image acquired from a camera mounted on a vehicle into a classifier that is pre-trained to output a proceedable certainty degree indicating a proceedable probability of each relative bearing with respect to a plurality of predetermined directions relative to the vehicle based on a display status of a traffic signal in the image;
   calculate, using the classifier, the proceedable certainty degree of each relative bearing based on the display status of the traffic signal in the image; and
   determine a proceedable direction of the vehicle based on the proceedable certainty degree of each relative bearing.

2. The proceedable direction detection apparatus according to claim 1, wherein:
   the classifier is pre-trained to calculate the proceedable certainty degree of each relative bearing based on a display characteristic of the traffic signal for each region; and
   the processor is configured to input, into the classifier, information indicating a region in which the vehicle is located, together with the image.

3. The proceedable direction detection apparatus according to claim 1, wherein:
   the processor is configured to, when the traffic signal has a plurality of traffic lights, calculate the proceedable certainty degree of each relative bearing for each of the lit traffic lights among the plurality of traffic lights; and
   the processor is configured to set, as the proceedable direction of the vehicle, a relative bearing in which the proceedable certainty degree that is equal to or higher than a predetermined threshold value is calculated for each of the lit traffic lights.

4. A proceedable direction detection method executed using a processor, the method comprising:
   inputting, by the processor, an image acquired from a camera mounted on a vehicle into a classifier that is pre-trained to output a proceedable certainty degree indicating a proceedable probability of each relative bearing with respect to a plurality of predetermined directions relative to the vehicle based on a display status of a traffic signal in the image;

calculating, by the processor, the proceedable certainty degree of each relative bearing based on the display status of the traffic signal in the image, using the classifier; and determining, by the processor, a proceedable direction of the vehicle based on the proceedable certainty degree of each relative bearing.

\* \* \* \* \*